United States Patent [19]
Friedman

[11] 3,858,190
[45] Dec. 31, 1974

[54] MULTI-BIT CORE READ OUT SYSTEM

[75] Inventor: Arthur L. Friedman, Studio City, Calif.

[73] Assignee: Electronic Memories & Magnetics Corporation, Los Angeles, Calif.

[22] Filed: June 18, 1973

[21] Appl. No.: 371,286

[52] U.S. Cl. .................340/174 ZB, 340/174 AN, 340/174 PA, 340/174 QA
[51] Int. Cl......................... G11c 11/06, G11c 27/00
[58] Field of Search...340/174 ZB, 174 QA, 174 PA, 340/174 AN

[56] References Cited

UNITED STATES PATENTS 3,315,087 4/1967 Ingenito........................ 340/174 ZB
3,573,760 4/1971 Chang.......................... 340/174 QA

*Primary Examiner*—James W. Moffitt
*Attorney, Agent, or Firm*—Lindenberg, Freilich, Wasserman, Rosen & Fernandez

[57] ABSTRACT

The data stored in a multi-bit core, which is a magnetic core that can digitally store a plurality of binary bits, is read out as an analog signal. This analog signal is then converted back to a representation of the binary bits stored in the multi-bit core.

6 Claims, 6 Drawing Figures

Fig. 1
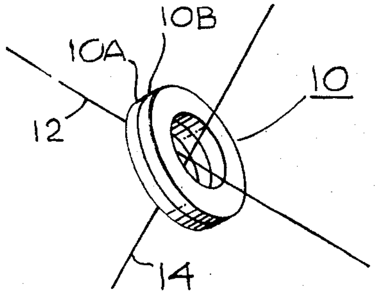
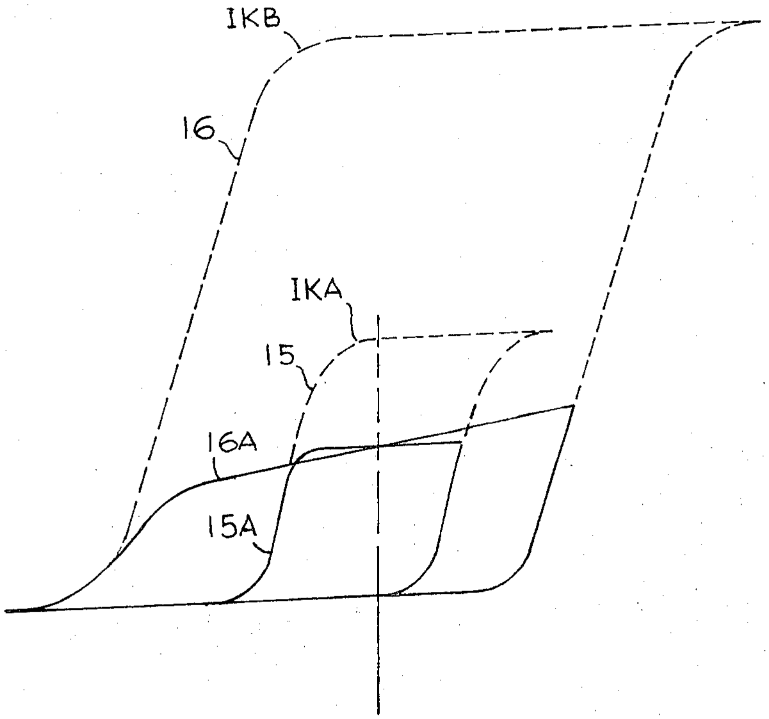
Fig. 2
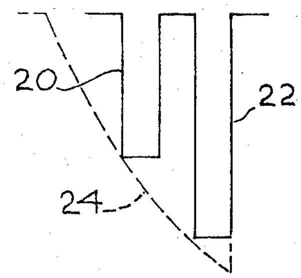
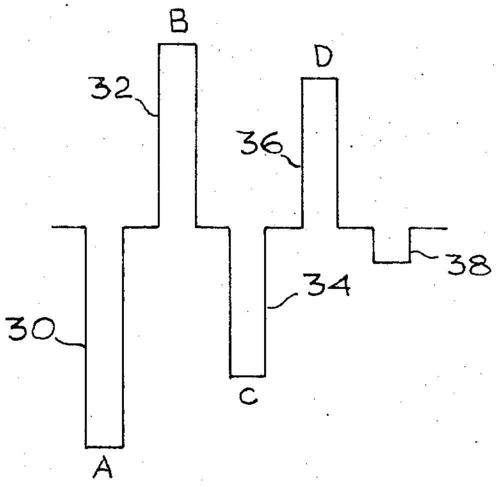
Fig. 3A Fig. 3B

MULTI-BIT CORE READ OUT SYSTEM

BACKGROUND OF THE INVENTION

This invention relates to magnetic core memories, and more particularly, to an improved method and means for reading data stored in a multi-bit magnetic core.

In an application entitled "Multi-Bit Core Storage," bearing Ser. No. 351,259, filed Apr. 16, 1973, to Leo et al., and assigned to a common assignee, there is described a magnetic storage core which can store a plurality of binary bits of information digitally. A core consists of a plurality of separate layers of magnetic material each having a different coercivity, and each storing a bit of binary information. The technique for reading the data stored in such a core is to apply to the reading winding or windings, either a ramp current or a succession of gradually increasing current pulses so that each layer of the multi-bit core is successively driven to provide an output signal.

While this technique is effective for deriving the information stored in the core, it does slow up the read out from the core since time is required either for the ramp voltage to increase from the minimum up to the maximum value required to turn over the highest coercivity layer of the multi-bit core, turning over the other layers along the way at spaced intervals determined by the slope of the ramp, or the pulses of successively increasing amplitude, must be spaced from one another so that there is no overlap of outputs from the successive layers being driven. If the core read out could be speeded up, it would make memory operation faster so that effectively, the efficiency of the utility of the memory could be improved.

Also, since in the read out from magnetic core memory, the information stored in the core is destroyed and must be restored, a further improvement in the speed of operation of a magnetic core memory could be achieved, if a way could be found to provide a non-destructive read out of the information in the cores of the memory. This would eliminate the time required to restore information into the memory and also would eliminate the hardware required for performing this "read back" operation.

OBJECTS AND SUMMARY OF THE INVENTION

An object of this invention is to provide a method and means for minimizing the time required for read out of data stored in a multi-bit magnetic core.

Another object of this invention is the provision of a method and means for non-destructively reading the information which is stored in a multi-bit magnetic core.

Yet another object of this invention is the provision of a novel method and means for reading the data stored in a multi-bit magnetic core.

These and other objects of the invention may be achieved in a multi-bit storage core system of the type wherein each core has a plurality of binary bit storage layers and stores a plurality of binary bits of information, by providing a read-out system which includes a means for driving all of the storage layers of a core substantially simultaneously to produce an analog signal having an amplitude representative of the binary bits stored in the core. The resulting signal is applied to an analog to digital converter which in response thereto provides a digital output comprising the binary bits which were previously stored in the multi-bit storage core.

The novel features of the invention are set forth with particularity in the appended claims. The invention will best be understood from the following description when read in conjunction with the accompanying drawings.

BRIEF DESCRIPTION OF THE DRAWINGS

FIG. 1 represents a multi-bit storage core.

FIG. 2 is a waveform drawing illustrating the hysteresis characteristics of the layers of the multi-bit storage core represented in FIG. 1.

FIG. 3A represents the current drive waveform heretofore used for read out from a two layer multi-bit core.

FIG. 3B represents a pulse wavetrain sequence which may be employed for writing into and reading from a two layer multi-bit storage core, in accordance with this invention.

DESCRIPTION OF THE PREFERRED EMBODIMENTS

Figure 4:
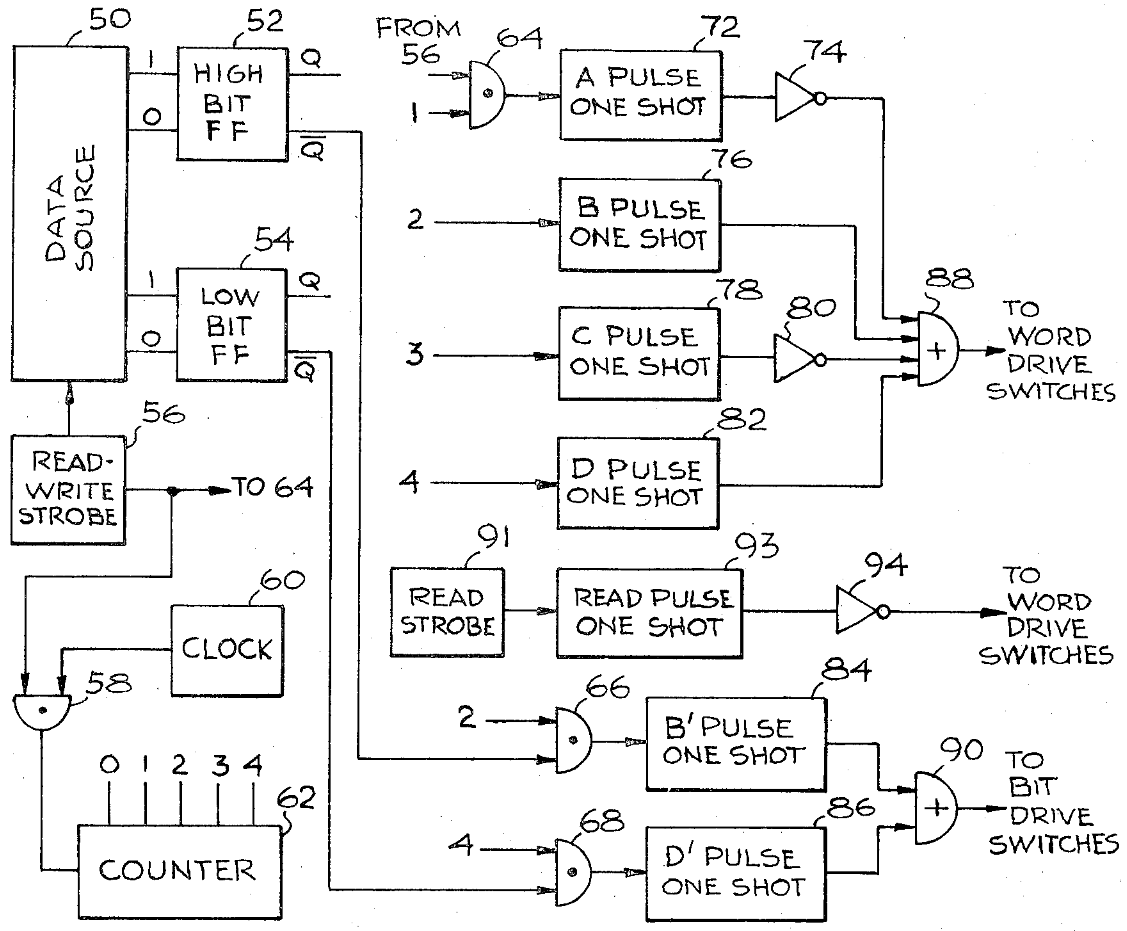
FIG. 4 is a block schematic diagram of a circuit arrangement which may be employed for generating the writing and reading program shown in FIG. 3.

FIG. 1 represents a multi-bit storage core 10 having two different coercivity layers, respectively 10A, 10B of ferrite material. Two wires, respectively 12, 14, are shown threading the core. As illustrated by the two dotted line hysteresis curves, 15, 16, for the two layers respectively 10A, 10B, of the magnetic material forming the core 10, the layer of material 10B, has a higher coercivity than the other layer of material, and therefore requires a higher drive current to be applied to the wire 12, in order to drive the core from one state of magnetic remanence, to the opposite state of magnetic remanence.

FIG. 3A represents a waveform of the increasing amplitude reading pulses used to read out of a core, such as shown in FIG. 1. First, a current pulse 20 is applied to the drive line 12. After this pulse subsides, a second pulse 22 whose amplitude is larger than the first pulse 20, is applied to the drive line 12. The amplitude of the pulse 20 is sufficient to drive the lower coercivity ferrite layer of the core so that if it is in its 1 state, it will be driven to its 0 state, and the consequent flux change induces a voltage in the sensing line 14. The pulse 20 does not affect the higher coercivity layer. This layer is driven in response to the current pulse 22. Thus, the two binary bits which are stored in the two layers of the core 10, are obtained in response to the read pulses 20 and 22. However, it should be noted that an interval is required for read out which is equal to the time required for the pulses 20 and 22 to take place. The two layer storage core is shown by way of illustration. The more layers, such as three or four which are provided, the greater the read out interval.

Another read out system which has been employed is to use a current pulse having a ramp leading edge. This is represented by the dotted line waveform 24. It will be seen that, as this ramp attains the level of the current pulse 20, a read out will be obtained from the lower coercivity core, and as it attains the amplitude of the current pulse 22, a read out will be obtained from the higher coercivity material core. In either event, it will be seen that separation of the outputs from each of the core layers requires a substantial read out interval.

FIG. 3B represents a waveform diagram which will assist in an understanding of the read out techniques to be employed with this invention. In one arrangement, a first current pulse 30 has a sufficient amplitude to drive all core layers or the entire multi-bit storage core to its all 0 state. This will result in a voltage being induced in the sense winding 14, having an amplitude determined by the digital states of the ferrite material layers. On the assumption, which is a practical one, that the high coercivity ferrite material, when switched from its 1 state provides a flux amplitude (or voltage) of four units and the lower coercivity core material, when switched from its 1 state, provides a flux amplitude (or voltage) of two units when read in the 1 state, and the flux amplitude derived if they are in their 0 states may be disregarded, as being insignificant, then the table below shows the output derived for the various storage states of the multi-bit storage core.

TABLE 1

| STORED DATA 10A | 10B | FLUX SWITCHED (UNITS) |
|---|---|---|
| 1 | 1 | 6 |
| 1 | 0 | 2 |
| 0 | 1 | 4 |
| 0 | 0 | 0 |

From the foregoing, it will be seen that the digital data stored in the core which is read by a single current pulse, produces an output voltage whose amplitude has a value indicative of the digital data which is stored.

The output read from a core may then be applied to an analog-to-digital converter which will then provide the digital information which was stored in the core. It will be apparent that the single current pulse takes half of the time for readout from a two layer multi-bit storage core than the usual technique for reading. Of course, the savings in time increases with the number of layers of core material used in making a multi-bit storage core. For example, in a four layer multi-bit storage core, which stores four digital bits, the use of this single current pulse analog read out technique saves three-quarters of the time that would otherwise be required.

When it is desired to write into a two level core, then depending of course on the binary information desired to be stored, a pulse sequence such as represented by pulses 32, 34 and 36 may be followed. Pulse 32 is a current pulse with an amplitude sufficient to drive both layers of ferrite material in the storage core to their 1,1 state. Pulse 34, which is of opposite polarity to pulse 32 has an amplitude sufficient to drive the lower coercivity material in the core to its 0 state, but not sufficient to change the state of the higher coercivity core. This leaves the cores in their 1,0 state. Pulse 36 has an amplitude sufficient to drive the lower coercivity material in the core back to its one representative state. Accordingly, if it is desired to store 1,0, pulse 36 is either suppressed or opposed. If it is desired to store 0,1 in the multi-bit core, then pulses 32 and 34 are suppressed or opposed.

The technique just described is for a destructive read out of the data in a core. For writing into the core in the non-destructive read out mode, the pulses 32, 34, and 36 are smaller in amplitude than the pulses used in the destructive read out mode such that the 1,1 states occur on minor hysteresis loops, rather than on the major loops which occurs in conventional destructive read out operation. The solid line curves respectively 15A, 16A represent such minor hysteresis loops for the respective layers of core material 10A, 10B. For a non-destructive read out, in accordance with this invention, a negative going read current pulse 38 is applied which has an amplitude less than the indicated knee current, (IKA or IKB) of the characteristic curves 15, 16 of the two layers of ferrite material in the multi-bit storage core 10. The knee current is the level on the hysteresis curve which must be exceeded by the current drive being applied so that the core material will be driven all the way over into its 1 state. The respective curves 15A and 16A represent the flux changes in the core layers which occur in response to a current drive represented by current pulse 38, which is below the knee levels.

On the assumption, as before, that the amount of flux switched during the read out operation is weighted as a function of the state of each core layer, the core layer 10A is constructed to yield a flux amplitude of two units when read in the 1 state, core layer 10B is contructed to yield a flux value of four units when read in the 1 state, and both core layers 10A and 10B produce flux amplitudes which are negligible when read in the 0 state. In the 0 state, read drive pulse 38 merely serves to drive the cores deeper into positive saturation and therefore the flux change is negligible. Table 2 illustrates the total flux switched during the read operation as a function of stored data. Application of the read pulse 38 leaves the digital data stored in the multi-bit storage core undisturbed.

TABLE 2

| STORED DATA 10B | 10A | FLUX SWITCHED (UNITS) |
|---|---|---|
| 1 | 1 | 6 |
| 1 | 0 | 4 |
| 0 | 1 | 2 |
| 0 | 0 | 0 |

It will be noted that when a core layer is in its 0 storage state, no output is obtained and when it is in its 1 storage state, an output is retained.

Again, an analog-to-digital converter, by amplitude level sensing, can produce an output which can be complemented to provide the binary data stored in the core which has just been read in analog fashion. If a positive going read pulse is used, instead of a negative going read pulse, then an output will be sensed from a core level when it is in its 0 state instead of its 1 state. In Table 2, six flux units will be derived from a core in its 1,1 state, and 0 flux units will be derived when it is in its 0,0 state.

When it is desired to write into a core, then the pulse sequence represented by pulses 30, 32, 34 and 36 may be employed.

FIG. 4 is an illustration of a drive circuit required to provide a program such as the one shown in FIG. 3B. A data source 50 inputs the data to be stored in a core into two flip-flops 52, 54 respectively a low bit flip-flop and a high bit flip-flop, in response to an output from a read-write strobe pulse source 56. The read-write strobe pulse output also enables an AND gate 58, whereby clock pulses can be applied through this AND gate from a source 60, to a cyclic counter 62. The write strobe pulse lasts long enough to enable the counter to complete a count cycle.

The high bit flip-flop 52, has its $\bar{Q}$ output connected to an AND gate 66. The $\bar{Q}$ output of flip-flop 54 is connected to an AND gate 68.

An AND gate 64 is enabled in response to a pulse from read-write strobe 56 and also the 1 count of counter 70. It then drives an A pulse one shot 72 whose output is inverted by an inverter 74. The output of the inverter has the amplitude and polarity of pulse 30. The 2 count of counter 62 drives a B pulse one shot 76 whose output has the amplitude of pulse 32.

A C pulse one shot 78 is driven in response to a 3 count of counter 62 and its output has the amplitude of pulse 34. This is inverted by an inverter 80. A D pulse one shot is driven in response to the 4 count of counter 62. Its output has the amplitude of pulse 36.

AND gate 66 is enabled in response to the 2 count of counter 62 and the $\bar{Q}$ output of the high bit flip-flop. Its output drives a B' 32 negative pulse one shot 84. The B' 32 negative pulse amplitude is sufficient to inhibit a core from being driven in response to a B pulse one shot output, but is not sufficient alone to drive a core to a 0,0 or 1,0 state. AND gate 68 is driven in response to a 4 count of counter 62 and a $\bar{Q}$ output of the low bit flip-flop. Its output drives a D' negative pulse one shot circuit 86. The amplitude of the output of this one shot is sufficient to inhibit a core from being driven to its 0,1 state in response to an output from the D pulse one shot, but is insufficient alone, to drive a core to its 1,0 state.

The outputs from one shots 76, 82 and inverters 74 and 80 are applied to an OR gate 88. The outputs from one shots 84 and 86 are applied to an OR gate 90. Now, if the destructive read out program is to be followed, upon the occurrence of output from the A pulse one shot, all layers of multi-bit storage core are driven to their 0 state and an output voltage occurs on the sense line whose amplitude is indicative of the binary bits stored in the core. Thereafter, in order to write information back into the core, the write pulse sequence occurs. The states of flip-flops 52 and 54 determine what data is stored in a multi-bit storage core.

If a non-destructive read out operation is desired, a separate read strobe 91 is energized. This drives the read pulse one shot 93 whose output is inverted by inverter 94. The amplitude of its output is represented by the pulse 38 shown in FIG. 3B. For writing, the pulse program represented by pulses 30, 32, 34 and 36 may be employed as well as the circuit arrangement shown in FIG. 4. The operation of these arrangements will become more clear after a description of FIG. 5 which shows, schematically, a memory system of the type which would use multi-bit storage cores.

Figure 5:
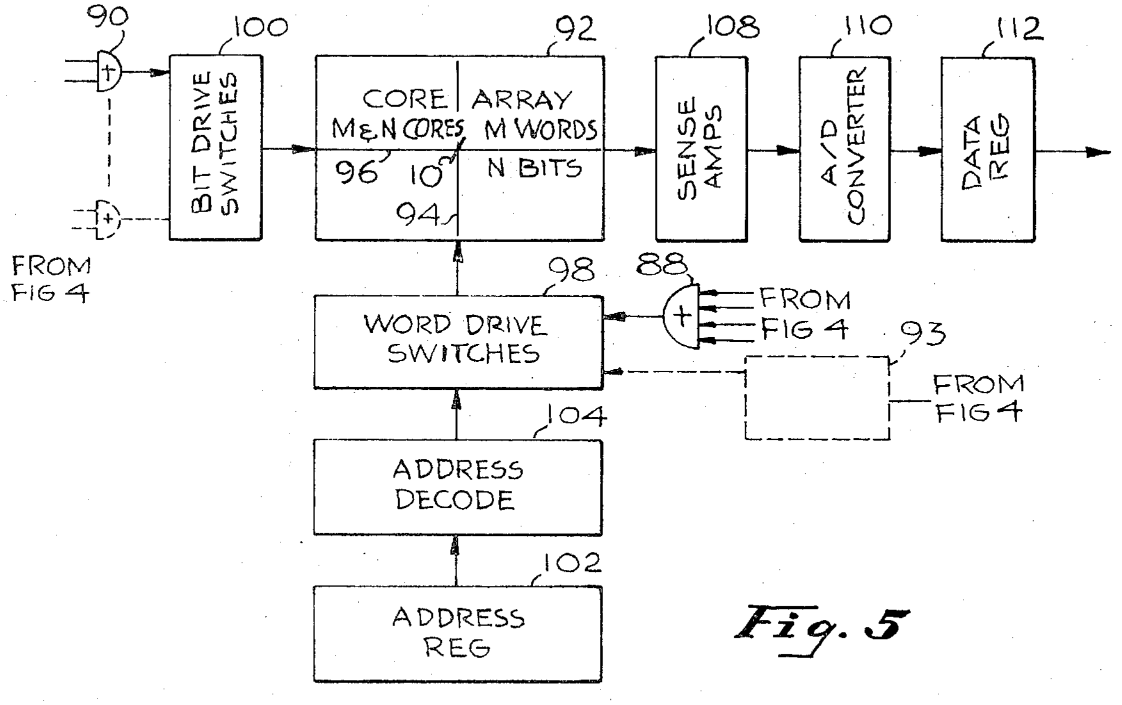
FIG. 5 is a block schematic diagram illustrating a writing and reading arrangement for a core array made of multi-bit storage core, in accordance with this invention.

Referring to FIG. 5, in a multi-bit core memory, the cores are arranged in a core array represented by the rectangle 96, of columns and rows. There would be for example, M × N cores in the array which would have a capability of storing M words, each word having 2N bits. This would be the situation in which each core stored two bits. If a three level core is employed, each word would have 3N bits. There are two wires per core, one of these wires 94 comprising a word drive wire and the other wire 96 comprising a sense or bit drive wire. A word drive is applied to a selected word drive wire coupled to a column of cores from a selected one of word drive switches 98. Bit drive is applied to all of the sense or bit lines, through bit drive switches 100. An address register 102 provides address data to an address decode circuit 104 for the word drive wires. The address decode circuits are used for the purpose of determining which one of the word drive switches, represented by rectangle 98 is to be energized for enabling current drive to be applied to a word drive wire.

The schematically described arrangement which has been described thus far, is an arrangement presently known as 2D arrangement, wherein each column of cores stores word data. For read out, usually, a read out current is applied to a selected word drive line (for example, 94) whereby all of the cores coupled to that line are driven. The outputs from each one of these cores is sensed by each one of the sense windings (96, for example) all of which terminate in a sense amplifier for each sense winding, represented by the rectangle 108.

Usually, when it is desired to write, a word drive switch is selected and the column winding connected thereto has applied a current pulse which would drive all of the cores coupled to that winding to their 1 state, were it not for the fact that all of the bit windings coupled to cores to which it is desired to preserve in their 0 states, receive inhibit current which oppose the one drive current and maintain these cores in their 0 states. The inhibit drives need not and do not have the same amplitude as the 1 drives since the drive required for a core to be driven to its 1 state must exceed a predetermined threshold and if that threshold is not exceeded, the core remains in its 0 state. As a result, the 0 bit drives do not disturb any of the other cores coupled to the windings in which the drives are occurring.

What has been described thus far is the usual 2D memory operation.

In accordance with this invention, a high bit and low bit flip-flop is provided for each multi-bit core in a word. That is, in the array exemplified, only N high bit and low bit flip-flops are required. Only one A, B, C and D pulse one shot circuits is required, but for each set of high bit and low bit flip-flops, a logic set represented by AND gates 66, 68 and their following circuitry is required. Each NOR gate 90 is connected to the bit drive line that is coupled to a core which is to store the data which is entered into an associated high and low bit flip-flop. When it is desired to read, in a destructive read out fashion, then the read-write strobe circuit 56, shown in FIG. 4, is actuated. This together with the one count of the counter enables the A pulse one shot circuit 72 to provide an output, as represented by current pulse 30. This is applied via NOR gate 88 and the selected word drive switch to a selected word drive line, in response to which all of the multi-bit storage cores coupled to that line are driven to their 0 states. The outputs from each of these cores comprising an analog voltage is induced on each one of the sensing lines, and is detected by the sense amplifiers 114. The output of each sense amplifiers is applied to an analog-to-digital converter 110, a plurality of which are represented by rectangle 124. Each of these analog outputs is converted into the respective binary bits which they represent. These binary bits are entered into and stored in the data register 112 for subsequent utilization.

Following the read operation, to write information into the cores, if it is desired, to write back information which has been read, the high bit and low bit flip-flops for each core have this data entered therein from the data register 112, or if not, can have fresh data entered therein. Upon the occurrence of the 2, 3 and 4 counts of the counter, data is written into the selected column of cores as follows.

As indicated when the counter reaches its first count, the A pulse one shot 76 is enabled whereby all of the cores coupled to the selected word line are driven to their 0 states. When the counter reaches its second count state, then the B pulse one shot is enabled. This applies a "one drive" current pulse 32 to the selected word drive line. For those of the cores coupled to the selected word drive line wherein it is not desired to store a 1 in the highest bit storage layer, the second count of the counter and the $\bar{Q}$ output of flip-flop 52 will enable the B' pulse one shot 84 to provide an output to its associated bit drive line whereby the core coupled to the associated bit drive line will not store a 1 in its highest order storage layer. Care must be taken to see that the amplitude of this B' inhibit pulse is less than the amplitude required to drive the lower coercivity cores to their 0 states. This is taken care of by properly controlling the values of the respective core layer coercivities.

On the count of three, the C pulse one shot is driven whereby the lower bit storage layer of the cores coupled to the selected word drive line are returned to their 0 states.

On the count of four, the D pulse one shot 86 is enabled. This applied a drive to the selected word drive line which would drive all of the lower order bit storage layers of the coupled cores to their 1 states except for the fact that those bit drive lines coupled to cores which it is desired to maintain in their 0 states have inhibit drives applied thereto. The inhibit drives are provided by enabling AND gate 68 in response to the 4 count and the $\bar{Q}$ output of the low bit flip-flop 54 to cause the D' pulse one shot 92 to be driven.

If non-destructive read out of the cores is desired, then, as shown in FIG. 4, a read strobe 91 is enabled whereby a read pulse one shot 93 is caused to produce a current pulse such as is represented by current pulse 38 in FIG. 3B. The output of the read pulse one shot 93 is applied to the word drive switches 98. As a result, the cores coupled to the word drive line, which has been selected, produce an output in the sense lines without having the data bits stored in these cores destroyed. As before, the sense line outputs are amplified by the sense amplifiers 110, converted back to digital form by the A to D converter 110 and stored in data register 112. Data register 112 has a flip-flop for storing data to be entered into each one of the core layers. For writing into the memory, the program represented by pulses 30 through 36 is followed, and the logic required is that shown in FIG. 4.

From the foregoing description, it should be apparent how one may read either destructively or non-destructively from a multi-bit storage core array. While the embodiment of the invention has been described using a two layer multi-bit storage core, this should be considered as exemplary only, since it will be obvious to those skilled in the art that the teachings of this invention are applicable to multi-bit storage cores having more than two layers.

What is claimed is:

1. In a multi-bit storage core system of the type wherein each core has a plurality of binary bit storage layers of different coercirity and stores one of a range of binary numbers as different combinations, of binary bits of information, means for reading the binary number stored in a core comprising:

means for driving all the storage layers of said core substantially simultaneously to produce an analog signal having an amplitude representative of the binary number within said range of binary numbers stored in said core, an analog-to-digital converter, and means for applying said analog signal to said analog-to-digital converter to generate the binary number stored in said multi-bit storage core.

2. In a multi-bit storage core system as recited in claim 1 wherein said means for driving said core to produce an analog signal representative of the binary numbers stored by said core includes:

means for applying a current pulse to said core having an amplitude which drives all of the storage layers in said core in a direction to store the same binary bit, and sensing means for adding all of the flux changes occurring in said core in response to the application of said current pulse.

3. In a multi-bit storage core system as recited in claim 1 wherein said means for driving said core to produce an analog signal representative of the binary number stored within said core comprises:

means for applying a current pulse to said core having an amplitude to cause flux changes in the storage layers of said core during the occurrence of said pulse which do not alter the binary bit storage states of said storage layers, and sensing means for summing all of the flux changes occurring in said storage layers in response to said current pulse.

4. In a multi-bit storage core system of the type wherein each core has a plurality of binary bit storage layers of different coercirity and stores one of a range of binary numbers as different combinations of binary bits of information, the method of reading the information stored in a core comprising substantially simultaneously driving all of the storage layers of said core with a current to produce flux changes in the storage layers representative of the one of the range of binary numbers stored therein, summing all of the flux changes occurring as a result of said driving to produce an analog voltage representative of all the binary bits stored in said core, and converting said analog voltage to digital voltages representative of the binary bits stored in said core.

5. In a multi-bit storage core system as recited in claim 4 wherein said step of driving includes driving all of said storage layers with a current which causes all of them to store the same binary bit.

6. In a multi-bit storage core system as recited in claim 4 wherein said step of driving includes driving all of said storage layers with a current which causes flux changes without altering the binary bit storage states of said storage layers.

* * * * *